April 17, 1928.

S. D. TRUMBO

ELECTRICAL ROACH TRAP

Filed July 6, 1926

1,666,723

INVENTOR.
Stacy D. Trumbo,
BY
ATTORNEY.

Patented Apr. 17, 1928.

1,666,723

UNITED STATES PATENT OFFICE.

STACY D. TRUMBO, OF COLUMBUS, OHIO.

ELECTRICAL ROACH TRAP.

Application filed July 6, 1926. Serial No. 120,613.

The present invention is directed to improvements in electrical insect traps, and more particularly to one for trapping roaches.

The primary object of the invention is to provide a device of this character that the roaches in an attempt to reach suitable bait within the trap will be stunned by an electrical shock to precipitate them into the trapping receptacle.

A further object of the invention is to provide a trap of this nature so constructed that it can be conveniently moved from place to place and connected with the usual house wiring circuit.

With these and other objects in view, this invention resides in the novel features of construction, formation, combination and arrangement of parts to be hereinafter more fully described, claimed and illustrated in the accompanying drawing, in which:—

Figure 1:
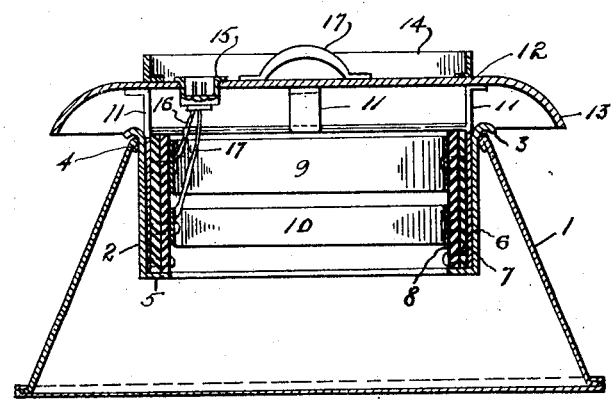
Figure 1 is a vertical central sectional view.

Referring to the drawing, 1 designates a trapping receptacle, which may be of any suitable shape and size, but in this instance illustrated as being circular in cross section and of frusto-conical shape.

Used in connection with the receptacle 1 is a removable collar 2 having its upper edge terminating in a curved flange 3 adapted to engage the rim of the opening 4 of the receptacle in order to suspend the collar within the receptacle with its lower end spaced from the bottom thereof. The lower edge of the collar is provided with an inturned horizontal flange 5, the purpose of which will appear later.

An electrode holder is employed and consists of a band 6 substantially the same size as the collar 2 and in which it is normally engaged, the downward movement thereof being limited by the flange 5. Interiorly of the band 6 are secured concentrically arranged rings 7 and 8 of suitable insulating material and fixed to the innermost ring 8 is a pair of ring formed electrodes 9 and 10, spaced vertically in order that when an insect is in contact with both electrodes sufficient shock will be imparted thereto to stun the insect, whereupon it falls into the receptacle 1.

Spaced brackets 11 are carried by the upper edge of the band 6 and to which the cover 12 is secured, said cover having a downwardly curved flange 13 which overhangs the side of the receptacle and serves to deflect the odor of the bait contained in the receptacle downwardly. These brackets serve to hold the cover spaced above the open end of the receptacle to permit the insects to pass to the electrodes in an attempt to reach the bait placed upon the bottom of said receptacle.

To the upper surface of the cover 12 is fixed a circular flange 14 which is adapted to detachably engage in the upper end of the collar 2 when the said cover is inverted to prevent escape of the insects when the trap is being moved from place to place.

Carried by the cover 12 is an electric socket member 15 and from which current is furnished to the ring electrodes 9 and 10 through the wires 16 and 17, respectively.

As shown in Figure 1 of the drawing the trap is in its set position and it will be obvious that the insects after crawling up the sides of the receptacle 1 can pass over the flange 3 and downwardly unmolested until their bodies bridge the gap between the electrodes 9 and 10, whereupon they are stunned and will fall into the receptacle.

Should the insects attempt to escape from the receptacle they will be again stunned as soon as they bridge the gap between said electrodes, which are confined within the receptacle and consequently rendered harmless against careless handling of the trap.

Figure 2:
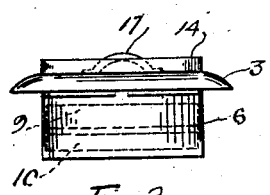
Figure 2 is a side elevation of electrode holding member.
Figure 3:
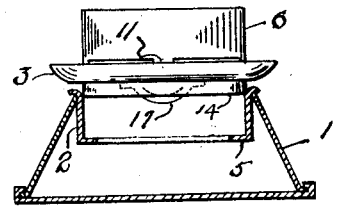
Figure 3 is a similar view thereof, showing the same in an inverted position upon the receptacle, the latter being shown in section.

After the trap has caught its quota, the electric connections are broken upon removing a plug (not shown) from the socket, whereupon the handle 17 is grasped and the cover and its associated parts inverted to enable the flange 13 to be placed in the collar 2, as shown in Figure 2 of the drawing in order that the trap can be handled without fear of the insects escaping therefrom in preparation to destroy the same in any suitable manner.

While I have described my invention as being particularly designed for trapping roaches it will be of course understood that the same can be used with equal success for trapping other insects and vermin.

From the foregoing, it is though that the construction, operation and many advantages of the herein described invention will be apparent to those skilled in the art, without further description, and it will be understood that various changes in size, shape, proportion, and minor details of construction may be resorted to without departing from the spirit of the invention.

What is claimed is:—

1. In a trap, the combination with a receptacle, of a collar suspended therein, a band removably engaged in the collar and having spaced electrodes thereon, a cover supported by the band and capable of being inverted to close the upper end of the receptacle, as and for the purpose set forth.

2. In a trap, the combination with a receptacle, of a collar removably engaged therein, a band removably engaged in the collar and having spaced electrodes thereon, a cover supported by the band and spaced therefrom, a flange carried by the upper surface of the cover, a socket member carried by the cover and in circuit with the electrodes, said flange being adapted to engage in the upper end of the collar when said band is removed from the collar and the cover is inverted.

In testimony whereof I affix my signature.

STACY D. TRUMBO.